000
(12) United States Patent
Jay

(10) Patent No.: US 7,001,523 B1
(45) Date of Patent: Feb. 21, 2006

(54) ION EXCHANGE

(75) Inventor: William Harold Jay, Doncaster (AU)

(73) Assignee: Oretek Limited, Perth (AU)

( * ) Notice: Subject to any disclaimer, the term of this patent is extended or adjusted under 35 U.S.C. 154(b) by 0 days.

(21) Appl. No.: 09/509,301

(22) PCT Filed: Sep. 25, 1998

(86) PCT No.: PCT/AU98/00811

§ 371 (c)(1),
(2), (4) Date: Jun. 13, 2000

(87) PCT Pub. No.: WO99/15273

PCT Pub. Date: Apr. 1, 1999

(30) Foreign Application Priority Data

Sep. 25, 1997 (AU) .................................... PO9462

(51) Int. Cl.
*B01D 15/04* (2006.01)
(52) U.S. Cl. .................... 210/683; 502/11; 502/402
(58) Field of Classification Search ................. 210/660, 210/670, 683–685, 661; 502/11, 402
See application file for complete search history.

(56) References Cited

U.S. PATENT DOCUMENTS

| | | | |
|---|---|---|---|
| 2,993,013 A | 7/1961 | Wolfe | |
| 3,805,532 A | 4/1974 | Kistner | |
| 3,890,254 A | 6/1975 | Guthrie | |
| 4,069,119 A | 1/1978 | Wong | |
| 4,137,200 A | 1/1979 | Wood et al. | |
| 4,160,076 A | 7/1979 | Guthrie et al. | |
| 4,284,511 A | 8/1981 | Weitzen et al. | ............. 210/661 |
| 4,622,344 A | 11/1986 | Babcock et al. | |
| 4,725,629 A | 2/1988 | Garvey et al. | |
| 4,731,391 A | 3/1988 | Garvey | |
| 4,826,497 A | 5/1989 | Marcus et al. | ............... 604/359 |
| 4,828,542 A | 5/1989 | Hermann | |
| 5,065,752 A | 11/1991 | Sessions et al. | |
| 5,104,909 A * | 4/1992 | Grasel et al. | ............... 521/159 |
| 5,296,518 A | 3/1994 | Grasel et al. | |
| 5,536,264 A * | 7/1996 | Hsueh et al. | ............... 604/365 |
| 5,591,779 A | 1/1997 | Bleys et al. | |
| 5,838,863 A * | 11/1998 | Fujiura et al. | ............... 385/103 |
| 5,900,146 A * | 5/1999 | Ballard et al. | ............... 210/222 |

FOREIGN PATENT DOCUMENTS

| | | |
|---|---|---|
| AU | B-18629/92 | 10/1992 |
| AU | B-19331/92 | 7/1993 |
| JP | 56-33044 | 4/1981 |

(Continued)

OTHER PUBLICATIONS

M.P. Maloney, et al., "Extraction and Separation of metal Ions by Foam-supported Reagents", *Proceedings of the Society for Analytical Chemistry. Analytical Division. Chemical Society*, London, GB, vol. 14, No. 9, pp. 244-246 (Sep. 1977).

(Continued)

*Primary Examiner*—Chester T. Barry
(74) *Attorney, Agent, or Firm*—Fish & Richardson P.C.

(57) ABSTRACT

An ion exchange material comprising a superabsorbent polyurethane foam having an ion exchange medium contained therein. The ion exchange may be used in a process for the extraction of metal anions and cations from solutions and/or slurries including the steps of: (a) contacting a metal ion-containing solution with an ion exchange material comprising a superabsorbent polyurethane foam having an ion exchange medium contained therein; (b) separating the ion exchange material from the solution and/or slurry; and (c) recovering the sorbed metal ions from the ion exchange medium.

13 Claims, 2 Drawing Sheets

FOREIGN PATENT DOCUMENTS

| | | | |
|---|---|---|---|
| JP | 2-140216 | * | 5/1990 |
| WO | WO 94/00237 | * | 1/1994 |
| WO | WO 95/18159 | | 7/1995 |
| WO | WO 96/28251 | | 9/1996 |
| WO | 97/10367 | | 3/1997 |
| WO | 99/13116 | | 3/1999 |

OTHER PUBLICATIONS

Chiarizia et al., "Diphonix® Resin: A Review of Its Properties and Applications" *Sep. Sci. and Technol.* 32, 1-4 (1997) pp. 1-35.

* cited by examiner

ION EXCHANGE

The present invention relates to ion exchange, in particular to ion exchange materials embedded in a polyurethane matrix. The present invention also relates to a process for the recovery of metal cations and anions from solutions and slurries.

Ion exchange resins are generally manufactured in bead or particulate form from polymers such as polystryrene-divinyl benzene, acrylic, or phenol-formaldehyde condensates. It has been proposed that ion exchange fibres can be produced from either polyacrylonitrile onto which active ligands can be attached, or polypropylene fibres on to which polystyrenedivinyl benzene can be grafted. Polyurethane foams have been proposed in PCT/AU93/00312 and PCT/AU94/00793 which are incorporated herein in their totality by reference.

Ligands can be attached to the surface of the particular ion exchange resins or fibres by conducting one or more suitable chemical reactions.

Commercially manufactured resins have several disadvantages, including small particle size to provide a large surface-to-volume ratio, often lower selectivity for one metal ion species over other metal ion species prevalent in leach liquors and $pK_a$ values which prevent the resin loading anions at pH values above about 10. Additional ligand capacity is provided by making the resin beads macroporous. This may be achieved by incorporating one or more porogens into the resin system during the polymerisation step. Such macroporosity, can lead to increased shattering of the beads in industrial processes.

The bulk density of the beads are not readily modified. Thus, the ion exchange beads being offered for application in for example, the gold industry have a tendency to float on the surface of the pulp during the cyanidation step. It is reported that this has led to loss of gold due to pilferage of the loaded beads.

In an effort to overcome this disadvantage, U.S. Pat. No. 4,284,511 which is incorporated here by reference, describes the addition of magnetic material, particularly finely divided particles of a non-corrosive, iron-chrome alloy to raise the bulk density of the polymer. This addition is proposed to be used with activated carbon, and polyurethane and similar materials when used in ion exchange columns, and in particular, in fluidised bed towers to enable higher fluid flow rates to be achieved.

Other disadvantages of currently available ion exchange resins for metal ion recovery include:
(a) purchase cost is high,
(b) the present need for fine sized beads (in order to achieve a significant concentration of ligands) renders it difficult to recover them from pulps by screening,
(c) stripping kinetics are slower and a more complex stripping regime is often required to effectively recover the metal ion for electrowinning.

We have now found that by embedding an ion exchange material in a superabsorbent polyurethane foam we are able to achieve superior ion exchange performance. The present invention accordingly provides an ion exchange material comprising a superabsorbent polyurethane foam having an ion exchange medium contained therein.

Figure 1:
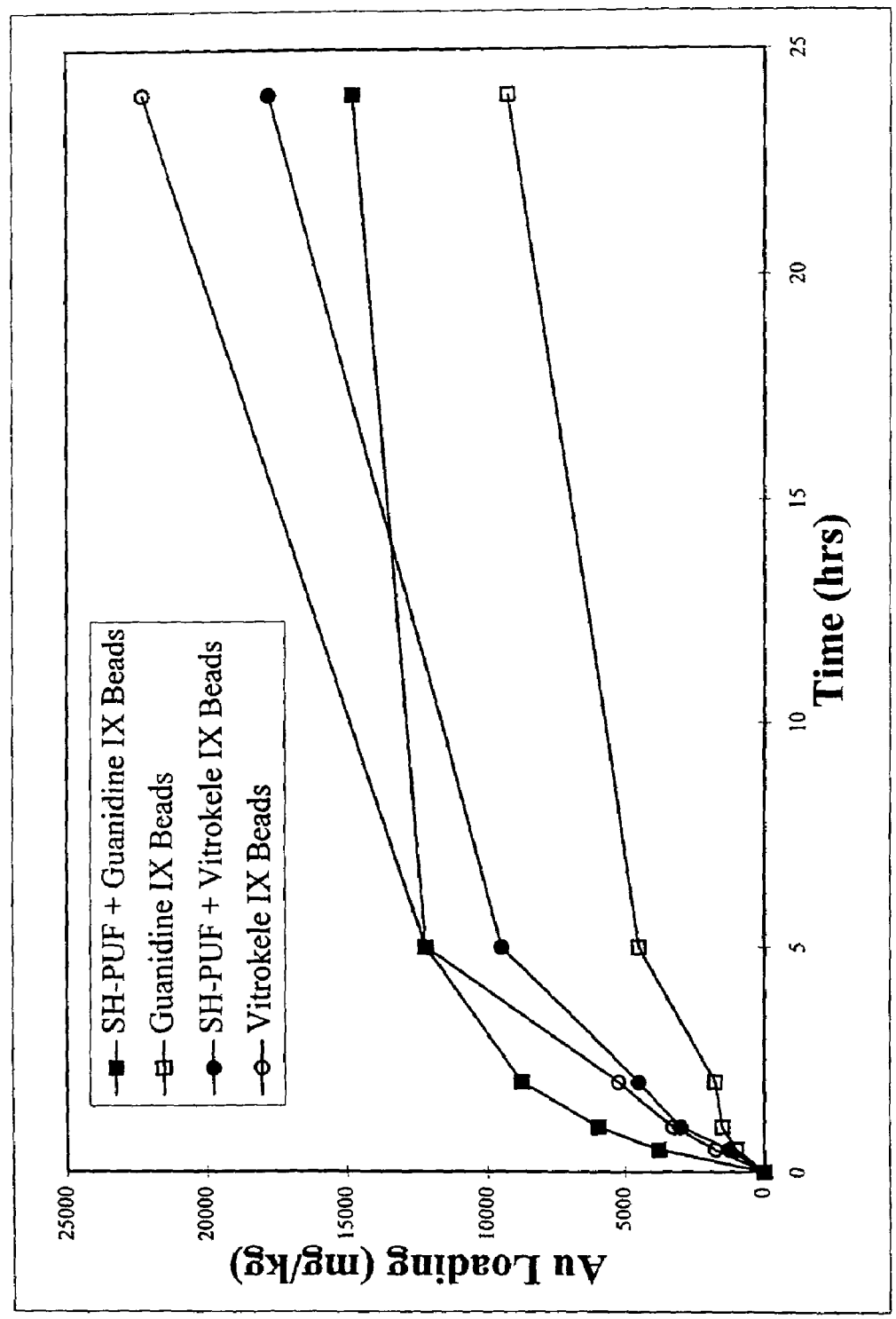
FIG. 1 is a graph showing the differences in gold loading between ion exchange resins containing a superabsorbent polyurethane and ion exchange resins without a superabsorbent polyurethane.

The present invention also provides a process for the extraction of metal anions and cations from solutions and/or slurries including the steps of:
(a) contacting a metal ion-containing solution with an ion exchange material comprising a superabsorbent polyurethane foam having an ion exchange medium contained therein;
(b) separating the ion exchange material from the solution and/or slurry; and
(c) recovering the sorbed metal ions from the ion exchange medium.

These superabsorbent, hydrophilic polyurethane polymers are chemical entities which are well known to those skilled in the art. Methods for the preparation or application of these polymers are typically described in U.S. Pat. Nos. 3,793,241; 3,854,535; 3,861,993; 3,890,254; 3,900,030; 3,903,232, 3,904,557; 4,110,508; 4,127,516; 4,137,200; 4,158,087; 4,160,076; 4,181,770; 4,266,043; 4,292,412; 4,314,034; 4,365,025; 4,337,645; 4,384,050; 4,384,051; 4,717,738; 4,725,628; 4,731,391; 4,740,528; 4,789,720; 4,798,876; 4,828,542; 5,065,752; 5,296,518; 5,591,779 and 5,624,971, which are incorporated herein by reference.

The procedure for the manufacture of the prepolymers described in the above patents is either given within the description, or can be produced according to typical procedures as described in various publications relating to polyurethane chemistry, or as disclosed in U.S. Pat. Nos. 2,726,219; 2,948,691; 2,993,013; 3,805,532 and 4,137,200.

In U.S. Pat. No. 4,725,629 a superabsorbent polyurethane foam is described which is based upon an interconnecting polymer network of a cross-linked polyurethane and a cross-linked addition polymer container a plurality of chain segments made up of functional groups containing repeating units which may be the same of different. These superabsorbent polymers are recommended for the manufacture of absorbent articles, especially disposable absorbent articles, such as nappies, sanitary napkins, bedpads, incontinent pads, and the like.

Superabsorbent polyurethane foams preferably derived from an isocyanate-terminated poly(oxyalkylene) polyol having an isocyanate functionality greater than two and containing an addition polymer such as acrylamides, acrylate and methacrylate salts, etc. are disclosed in U.S. Pat. No. 4,731,391.

British Patent 1,209,058 discloses a hydrophilic polyurethane foam in which a polyether polyol containing a block of ethylene oxide capped with propylene oxide to obtain hydrolytic stability is reacted with a polyisocyanate. Only small quantities of water are used. The foams produced by this method have very poor water absorbing properties.

A superabsorbent polyurethane foam into which microcapsules of active ingredients are formed is described in U.S. Pat. No. 4,828,542. The hydrophilic polyurethane prepolymer is foamed by mixing with water in the range of at least approximately 0.2/1 or greater and preferably 1/1 or greater.

U.S. Pat. No. 5,065,752 describes a superabsorbent, hydrophilic foam composition for wound dressings. The polyurethane foam is produced by the in-situ reaction product of an isocyanate-capped polyether prepolymer, a polymeric hydrophilic agent capable of absorbing water (such as starch grafted copolymers of acrylate salts, or acrylamide salts), an adjuvant comprising a water-soluble alcohol, a wetting agent, and water.

U.S. Pat. No. 5,591,779 discloses a process for preparing a superabsorbent polyurethane foam by reacting a suitable polyurethane prepolymer with water in the presence of a superabsorbent polymer. The polyurethane prepolymer contains an oxyethylene content of at least 50% by weight. The amount of water required being 15 to 500 parts by weight of the weight of the prepolymer. At the start of the reaction, the temperature of the water being 10° C. to 50° C. higher than the temperature of the prepolymer.

The ion exchange medium may be any convenient ion exchange medium suitable for sorbing the desired metal ions from the solution and/or slurry. The ion exchange medium may be in the form of a bead, resin, fibre, foam, or liquid.

Ion exchange mechanisms generally involve the exchange of ions in solution with the counter ions associated with the ligands present in the extractant. The extractant may be either an insoluble solid inorganic or organic material, or a water-insoluble organic molecule. Thus, the desired extractant therefore contains anionic, cationic, or chelating ligands capable of recovering the desired metal ion from either solutions or from slurries.

Normally a metal ion exists in an aqueous solution as a hydrated ion with little or no tendency to transfer to an organic phase. To enable an ion to transfer into an organic phase it is generally required that its charge must be neutralised and some, or all of its water of hydration has to be replaced by some other molecule or ion. For example, as reported by Irving and Damodaran the aurocyanide anion is generally weakly hydrated compared to other cyano-metallic complexes. Thus, its affinity for organic matrices relative to other more strongly hydrated anions, will be greater. A study on ionic mobilities in the Nernst layer has shown that the aurocyanide complex is significantly smaller and less hydrated than other cyano complexes. Examination of the hydration and ion pairing of the Au $(CN)_n^-$ complex in aqueous solution does however require further investigation. Therefore, for a metal ion to be removed from the aqueous phase, these conditions can be met by:

(a) complexing the ion with an ion of opposite charge to form a neutral species, which at the same time replaces some or all of the water of hydration around the metal ion, (b) by formation of ion-association complexes which also provide for the formation of a neutral species with the extractant, (c) by replacing the water of hydration with molecules of the extractant.

An ion exchange medium, thus, may be a polymeric material in particulate, bead, fibre or foam form which carries a fixed positive or a fixed negative electrical charge. This electrical charge is balanced by ions of opposite sign, called counter ions. In solution, these counter ions are free to move within the resin matrix and therefore can be replaced, or exchanged, by other ions of the same sign. Thus systems employing chelating and acidic extractants are cation-exchange reactions, and those employing anion exchange systems are anion-exchange reactions.

Extractants containing C—O bonds are electron donating compounds, but alcohols being amphoteric, exhibit both donor and acceptor properties and resemble water in many ways. Thus, the formulation of superabsorbent polymers based upon poly(oxyethylene) glycol, and if required sulphonic groups in the polymer structure, will enhance metal ion transport. Alcohols such as pentanol, n-hexanol, 2-ethylhexanol, isodecanol, dodecanol, tridecanol, hexadecanol, octadecanol; phenols such as heptylphenol, octylphenol, nonylphenol and dodecylphenol may be included into these superhydrophilic foams to improve salvation and also metal ion transport. The need for hydrophilicity in the polymer to enhance the metal ion loading is demonstrated by Chiariza, R., et al., *Diphonix® resin: A review of its properties and applications*, Sep. Sci. and Technol—(1997), 32 (1–4), 1–35.

The preferred aromatic isocyanates are 2,4- and 2,6-toluene diisocyanates and methylene-bridged polyphenyl polyisocyanate mixtures which have a functionality of from about two to about four. These latter isocyanate compounds are generally produced by the phosgenation of corresponding methylene-bridged polyphenyl amines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described for example in U.S. Pat. Nos. 2,683,730, 2,950, 263, 3,012,008, 3,344,162 and 3,362,979.

Most preferred methylene-bridged polyphenyl polyisocyanate mixtures used herein contain about 20 to about 100 weight percent methylene diisocyanate isomers, with the remainder being polymethylene polyphenyl isocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher weight and functionality of from about 2.1 about 3.5. These isocyanate mixtures can be prepared by the process described in U.S. Pat. No. 3,332,979.

A commercially available MDI compound with especially desirable properties is Isonate 143L which is produced by reacting MDI to form the carbodiimide and this material in turn reacts to form a tri-functional cycloadduct. The mixture of MDI, the carbodiimide and the cycloadduct are in equilibrium. The mixture contains a major amount of pure diphenylmethane diisocyanate and minor amounts of carbodiimides and trifunctional cycloadducts of diphenylmethane diisocyanate. As described, the term derivatives of diphenylmethane diisocyanate mean products that have been made from MDI as a starting material. It includes adducts dimmers, and trimers.

Other compounds which are useful are the isocyanate equivalents which produce the urethane linkages such as the nitrile carbonate, including the adiponitrile carbonate.

Also, both ethers and ketones allow a high degree of metal hydration in the solvent phase. For example, in the extraction of ferric chloride into ether, five molecules of water are associated with the extracted metal complex in the solvent phase and solvation numbers as high as 12 have been reported. Thus, superhydrophilicity enables these water molecules to be rapidly transported through the polymer to the reactive sites.

The preferred components include a diol having greater than about 80% by weight of poly(oxyethylene) groups (such as PEG 1000) to provide the water-absorbing property, trimethylolpropane as the crosslinking agent, suspending or thickening agents and the isocyanate used to cap or terminate the polyol is as described above.

The poly(oxyethylene) polyol may have a molecular weight of about 200 to about 20,000 and preferably between about 600 to about 6,000 and most preferably about 1000 to about 1400, with a hydroxyl functionality of about 2 or greater, but preferably from about 2 to 6 and most preferably, 2.

The chain extenders which may be added to provide crosslinking strength to the foam are relatively short, low molecular weight monomeric polyols having three or four hydroxyl equivalents per mole. Such materials include glycerol, trimethylolpropane, trimethylolethane, triethanolamine, pentaerithritol, or mixtures thereof.

Suspending or thickening agents include acrylic acid-based polymers such as Carbopol 934 and Carbopol 940. A neutralising agent such as sodium or ammonium hydroxide can be added.

The capping or termination reaction between the isocyanate and the polyol may be carried out in an inert moisture-free atmosphere such as under a nitrogen blanket, at atmospheric pressure at a temperature in the range of about 0° C. to about 120° C. for a period of time of up to about 24 hours depending upon the temperature and the degree of agitation and cooling or heating applied to the reactor.

Superabsorbant microcellular resins and foams differ from polyurethane foams in that they are normally produced by the reaction of a suitably formulatend isocyanate terminated polymer with a very significant excess of water. The polyol portion of the polymer is generally based upon poly(oxyethylene) glycol, and the isocyanate component is generally TDI, MDI or MDI-based isocyanate or mistures of both isocyanantes.

Another very desirable property of the instant foams is the elimination of silicone surfactants from the formulation. It has been observed that these nonionic silicone-based raw materials are specifically formulated so that they migrate to the surface of the rising foam to control the surface tension, promote nucleation and stabilise the rising foam by reducing stress concentrating in thinning cell-walls and counteract any defoaming effects caused by the presence of added, or generated/solid matter. Thus, these polymers remain at the surface of the cured polyurethane foam and interfere with subsequent interpenetration of a second polymer or surface reactions conducted on the polyurethane foam cell walls.

The use of water soluble or water dispersable-surface active agents in urethane-urea foams is taught in U.S. Pat. Nos. 3,890,254 and 4,160,076 to be critical to the attainment of many useful properties. Whereas, in U.S. Pat. No. 5,296,518 it was recognised that the choice of certain isocyanate-capped high molecular weight molecules can be used in place of these surfactants. Being water soluble, and not taking part in the chemical reaction, they can be leached out of the foam. Thus, the presence of these surface active agents does not interfere with subsequent surface reaction such as interpenetration of a second polymer system.

The level of surfactant may be varied from 0% to about 5% based upon the total water content of the formulation. If low levels of surfactant are used higher density foams will generally result. Such polymers will have advantage in applications in which the final product is required to offer improved abrasion resistance. In the present invention the Pluronic series of surfactants manufactured by BASF are preferred, with Pluronic L62 being particularly preferred in this aspect.

Thermal reticulation may be advantageously conducted whereby the windows or membranes are removed from individual cells or bubbles which make up the foam structure. Reticulation results in a foam preferably having at least 95% of open cells and most preferably 99% open cells. Thermal reticulation of polyurethane foam is a known procedure to those skilled in the art and as disclosed for example in U.S. Pat. Nos. 3,171,820 and 3,875,025 and 3,175,030. Reticulation is achieved by providing a combustible mixture of an oxidizer material and an oxidisable material within whereupon the cell windows or membranes are destroyed. It is also possible to swell the polyurethane foams in an organic solvent to increase the cell size.

Thus, as disclosed in U.S. Pat. No. 4,985,467, the skeletal structure is completely open, and with such a structure, it will more rapidly absorb large amounts of liquid than an a non-reticulated cellular foam.

Poly(ethylene oxide) derivatives are good solvents for metal ions because of the Lewis-base nature of the lone pairs on the oxygen atom. Macrocycles based on the ethylene oxide unit, the crown ethers, are amongst the strongest known complexing agents for cations. The reason for this is twofold, namely, the rings formed by ethylene oxide units tend to place oxygen atoms in favourable positions for the formation of coordination bonds with metal cations; and secondly, the excellent solvating properties of poly(ethylene oxide).

To produce the desired superabsorbent ion exchange resins, several different methods may be adopted. In one preferred method, commercially produced solid ion exchange polymers may either be comminuted to reduce their particle size, or they may be used directly in the resin forming step, details of which appear below.

Alternatively, an another preferred method, organic liquid ion exchange materials may be imbibed into a solid sorbent in a suitable form such as particulates, sheets, fibres, foams. Such solid sorbents include styrene-divinyl benzene, acrylic, phenolformaldehyde, polyvinyl chloride, carbon, zeolites, vermiculite, etc and then incorporated into the superabsorbent resin.

Whilst the extractants may be imbibed into pulverised materials, it is also acceptable that highly porous materials, such as activated carbon, granules be used. The extractant can be imbibed into these materials, preferably under reduced pressure to remove entrapped air form within the porous material. A dilute coating of the prepolymer, such as is described in Example 7, may then be applied to the outer surface of the beads.

A further method is to melt a suitable wax such as petroleum wax, beeswax, a mixture of waxes etc., in hot water containing a suitable surfactant such as Pluronic L62 manufactured by BASF and add the liquid ion exchange or extractant mixture whilst stirring to form an emulsion. Continue stirring during cooling to room temperature to from an aqueous emulsion dispersion of the organic mixture in water. This aqueous emulsion is then used as part of the aqueous phase for production of the superhydrophilic polymer.

TBP addition to an uncharacterised polyurethane foam for the recovery and separation of nickel and palladium is described by Braun and Farag, Talanta (1972), 19, 828–830. This foam would not have provided sufficient hydrophilicity as enunciated in the present disclosure.

A number of phosphates, including di(2-ethylhexyl) phosphate, and particularly tri-n-butyl phosphate (TBP) have been extensively employed in solvent extraction systems for metal ions. TBP has been included in a number of patents relating to gold recovery from chloride and cyanide solutions. It is used in industrial process to remove arsenic from copper solutions. It is proposed as a suitable extractant for zinc from acid solution.

As a general rule, the extractive power of phosphorous containing extractants increases with an increase in the number of carbon-phosphorous bonds over the series, phosphate-phosphonate-phosphine oxide. The solubility of neutral organophosphorus compounds in water decreases in the order phosphine oxides>phosphinates>phosphonates>phosphates. This is as a result of the increasingly polar nature of the phosphonyl group. It should be noted that in acid solutions these extractants have low solubility, but as the pH increases, so solubility increases. It is known that the phosphoryl oxygen forms hydrogen bonds with water, and the bond energy is approximately 5 kcal/mole. The more basic oxygen in a phosphonate gives a hydrogen bond energy of about 7–8 kcal/mole.

Dialkyl phosphorodithioioic acids, phosphonates, dialkylthiophosphate, sulphur-containing methyl phosphonates and ketophosphonates and the trialkyl thiophosphates have been shown to be highly selective for gold, silver and mercury. Triiso-octyl thiophosphate and tri-n-butyl thiophosphate are similar to their trialkyl phosphate counterparts except that the P=O has been replaced by a P=S group. The semipolar sulphur atom is the sole structural difference between the two types. Handley and Dean proposed that the trialkyl thiophosphates probably act by solvating an electrically neutral ion association complex.

The ion association bonding occurs through the P=S group. The semipolar sulphur atom has very little electron donating ability, and will bond only to ions of high field strength. Silver and mercury fit this criteria and also are amongst those metals which prefer sulphur-containing ligands. These extractants have been shown to reduce Au (III) to Au°.

Extraction of cadmium, zinc, and mercury have been demonstrated to be possible with thiophosphorus compounds containing a P—SH group. The affinity of these metals for sulphur increases in the order zinc<cadmium<mercury. The extractants studied included di-n-butyl thiophosphite (DBTP) and the di-n-butyl ester of 2-hydroxypropan-2-thiophosphonic acid (DBPrPS). It has been reported that mercury and gold (III) chloride are extracted from hydrochloric acid solutions with triisobutylphosphine sulphide (Cyanex 471X). This extractant is particularly selective for silver and for the separation of palladium and platinum.

In extraction of metal ions from acidic media generally two molecules of TBP are involved in the extracted species. Furthermore, as the acid concentration increases so extraction of metal increases until a maximum is reached above which extraction decreases.

In a similar manner, dibutyl butyl phosphonate (DBBP) has been employed for the extraction of gold, and PGM's, and for zinc. DBBP has a high selectivity and loading capacity for zinc in chloride solutions resulting from ferric chloride leaching of a complex sulphide ore. Extraction was found to be independent of pH. He reported that two moles of DBBP react with one mole of zinc. As a solvating extractant, extraction occurs as the extractant molecules replace water molecules in the primary hydration sheath of the extracted species. From the determination of free activities of water and free chloride ions it was shown that four water molecules and two chloride ions are involved for each extracted zinc species. The extraction reaction may be written as follows:

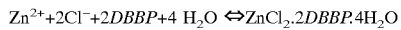

DBBP may form dimers at concentrations higher than $3.7 \times 10^{-1}$ mol/dm$^3$ and thus at lower concentrations the plot of Log [DBBP] versus Log E a straight line with a slope of two is obtained. At concentrations higher than $3.7 \times 10^{-1}$ mol/dm$^3$ the slope is greater than two possibly because the extraction equilibrium changes in favour of extraction when DBBP dimers form. DBBP may form dimers at higher free DBBP concentrations in a manner similar to that reported by Burger for tributyl phosphate.

Industrial applications of ion exchange resins are many, particularly in the treatment of boiler feedwater. U.S. Pat. No. 4,069,119 which is incorporated here by reference, describes the application of ion exchange resins to recover copper from dilute solutions emanating from vat leaching of copper ores. This patent describes the beneficial effect of recovery from solutions containing significant levels of dissolved silica. This patent describes ion exchange resins in bead form, including polyurethane foams and porous beads impregnated with conventional organic solvent extraction agents to produce materials which may be employed as ion exchange beads in this application.

Other methods for the preparation or application of these polymers are typically described in U.S. Pat. Nos. 3,793,241; 3,845,535; 3,861,993; 3,890,254; 3,900,030; 3,903,232; 3,904,557; 4,110,508; 4,127,516; 4,137,200; 4,158,087; 4,160,076; 4,181,770; 4,226,043; 4,292,412; 4,314,034; 4,365,025; 4,337,645; 4,384,050; 4,384,051; 4,717,738; 4,725,628; 4,731,391; 4,740,528; 4,789,720; 4,798,876; 4,828,542; 5,065,752; 5,296,518; 5,591,779; and 5,624,971 incorporated herein by reference.

The procedure for the manufacture of the prepolymers described in the above patents is either given within the description, or can be produced according to typical procedures as described in various publications relating to polyurethane chemistry, or as disclosed in U.S. Pat. Nos. 2,726,219; 2,948,691; 2,993,013; 3,805,532 and 4,137,200.

Advantageously the ability to incorporate large volumes of water into formulation provides an opportunity to incorporate water-based polymer emulsions directly into the polymer. This cannot generally be achieved by the application of conventional polyurethane foams. Water-based polymers eliminate the requirement for solvents in the polymer preparation and therefore eliminate the need to remove and capture enviromentally undesirable solvents. Typically, such emulsions may be water-based emulsion resulting from the reaction of vinylidene diphosphonic acid with polyurethane foam, offer exceptional selectivity for Fe(III) in the presence of Cu(II) in acid solutions commonly encountered in copper electrowinning tankhouse beel streams.

The present invention will now be further described by the following non-limiting examples.

EXAMPLES

Example 1

A hydrophilic prepolymer "Prepolymer" was prepared by reacting together a 1000 MW poly(oxyethylene) glycol with toluene diisocyanate to produce an isocyanate-terminated prepolymer and then adjusted by the addition of MDI to produce a finished product with a free NCO content of 9.5%.

| PEG1000 | 100 pbw |
| TDI | 44 pbw |
| MDI | to provide a Free NCO content of 9.5% |

Into a suitable mixing container were added:

| Separan Solution (1% in water) | 25 g |
| Water | 75 g |
| Pluronic L62 | 1.0 g |
| Vitrokele V912 (ion exchange beads) | 20 g |
| Ferrosilicon powder | 20 g |
| Dyestuff | 1 drop |

The ingredients were thoroughly mixed together and then poured into a second container containing 50 grams of the following mixture:

| Prepolymer | 10 g |
| Isonate 143L | 1.5 g |

The mixture was allowed to rise to form a foam. Pieces were then cut from this foam for metal ion loading. Alternatively, the mixture was allowed to react and cure between two sheets of waxed paper and constrained in such a manner that a sheet of about 5 mm in thickness was obtained. This sheet was cut to size.

The polymer produced was used to remove gold cyanide and copper cyanide from aqueous solutions and slurries.

Example 2

In the examples in which a liquid organic extract was used, the following procedure was adopted:

| XAD-16 (Manufactured by Rohm and Haas) milled | 10 g |
| LIX 84I (Manufactured by Henkel Corporation) | 10 g |
| Polyethylene glycol 1000 | 2 g |

The solid resin and the organic extractant were combined together and heated to about 35° C. with constant stirring. Once the extractant was fully imbibed into the resin, the PBG1000 was added and stirring continued. A dry powder was obtained.

This powder was then mixed with the following:

| Powder | 15 g |
| Ferrochrome | 10 g |
| Water | 20 g |
| 1% Separan Solution | 5 g |
| Pluronic L62 | 0.75 g |

To this mixture was added:

| Prepolymer | 20 g |
| Isonate 143L | 5 g |

The mixture was allowed to rise to form a foam. Pieces were then cut from this foam for metal ion loading. Alternatively, the mixture was allowed to react and cure between two sheets of waxed paper and constrained in such a manner that a sheet of about 5 mm in thickness was obtained. This sheet was cut to size.

The polymer produced was used to remove copper ions from aqueous solutions.

Example 3

Into a suitable mixing container was added:

| Separan solution (1% in water) | 6 g |
| Water | 60 g |
| Pluronic L62 | 0.75 g |
| Ion exchange beads with guanidine functionality | 20 g |
| Liquid guanidine-based extractant | 5 g |
| Pentanol | 5 g |
| PEG1000 | 5 g |
| Ferrosilicon powder | 5 g |
| Dyestuff | 1 drop |

The ingredients were thoroughly mixed together and then poured into a second container containing 40 grams of the following mixture:

| Prepolymer | 180 g |
| Isonate 143L | 30 g |

Example 4

0.1 g of each of the ion exchange polymers described in Examples 1 and 3, Vitrokele V912 and guanidine resin (based upon its dry weight) was contacted with 500 mls of a solution containing 5 ppm gold (as gold cyanide)+200 ppm of $CN^-$ (as sodium cyanide), the pH being adjusted to 10.6. At the specified time intervals, samples of the aqueous solution were withdrawn and analysed by AAS technique. The results obtained are given in FIG. 1.

Example 5

Figure 2:
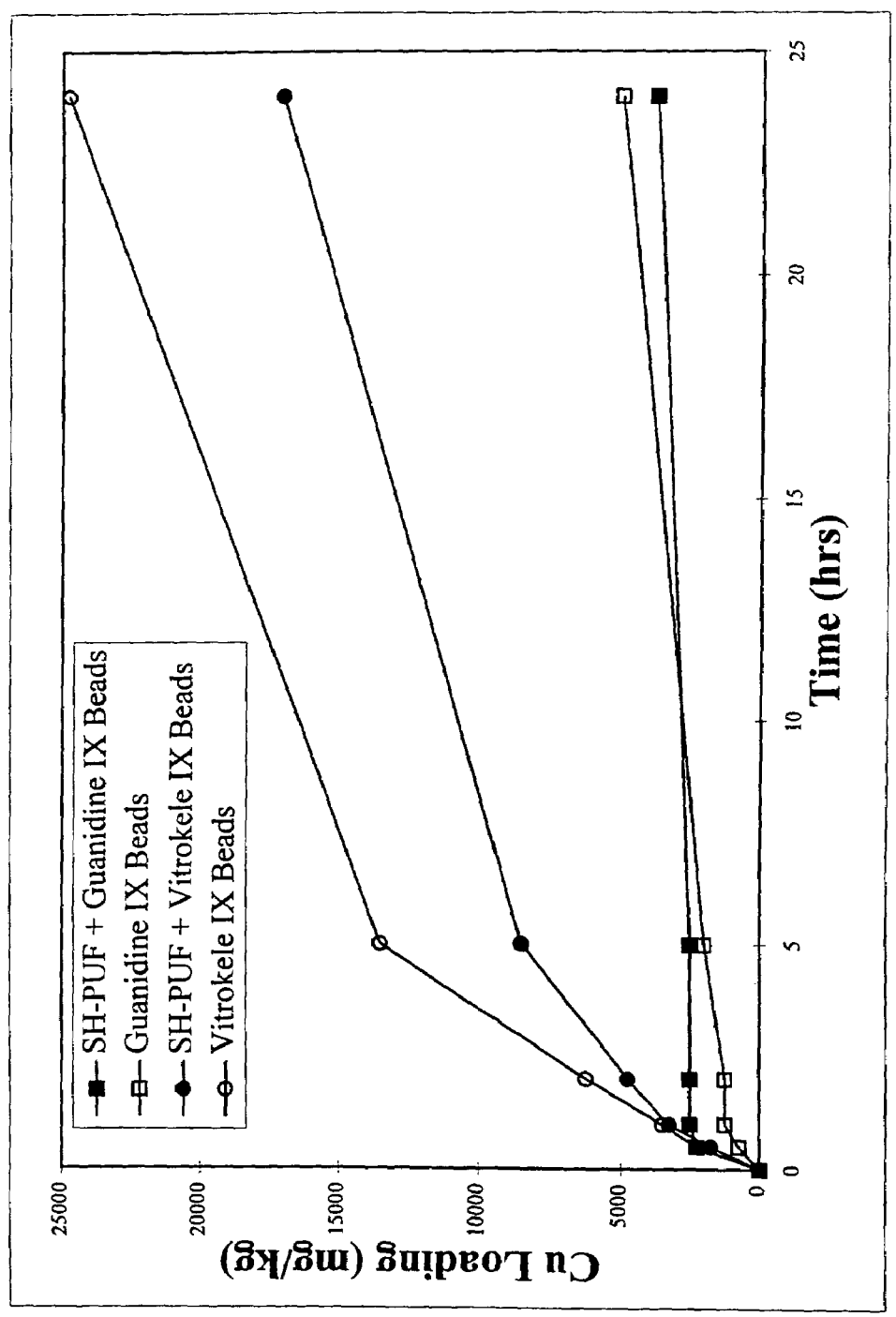
FIG. 2 is a graph showing the differences in copper loading between ion exchange resins containing a superabsorbent polyurethane and ion exchange resins without a superabsorbent polyurethane.

The experiments conducted in Example 4 were repeated but in this case, the gold cyanide was replaced with 5 ppm of copper as copper cyanide. The results obtained are give in FIG. 2.

Example 6

A polymer was prepared by:

| Styrene-divinyl benzene resin (XAD-7 milled) | 10 g |
| LIX 84I | 10 g |

The solid resin and the organic extractant were combined together and heated to about 35° C. with constant stirring. Once the extractant was fully imbibed into the resin, a dry powder was obtained.

This powder was then mixed with the following:

| | |
|---|---|
| Powder | 20 g |
| Water | 30 g |
| Pluronic L62 | 0.75 g |

To this mixture was added:

| | |
|---|---|
| Prepolymer | 20 g |

The mixture was allowed to rise and cure.

Example 7

A reticulated polyurethane foam was imbibed with 25% of LIX 84I and then dipped in a mixture of Prepolymer: water of 1:5, drained and allowed to cure.

Example 8

The LIX 84I syperhydrophilic foams prepared as described in Examples 2, 6 and 7 were compared with equivalent weights of commercially available copper-selective ion exchange resins as follows:

A feed solution containing 77 ppm copper, 570 ppm iron (as Fe (III)) at pH 2 was contacted with each of the polymers, the experiments being conducted at room temperature.

After 20 hours the loadings of copper obtained were:

| | Cu | Fe |
|---|---|---|
| Amberlite IR-120 (sulphonic acid functionality) | 4 mg/g | 95 mg/g |
| Amberlite IMAC HP 333 (carboxylic acid funct.) | 0 mg/g | 65 mg/g |
| Amberlite IRC-718 (iminodiacetic acid funct.) | 11 mg/g | 75 mg/g |
| Example 2 | 11 m/g | 20 mg/g |
| Example 6 | 23 mg/g | 25 mg/g |
| Example 7 | 8 mg/g | 0 mg/g |

The results given in Examples 1, 3, 4 and 8 indicate that on a ligand functional basis, the superhydrophilic foams show faster loading kinetics and improved loading when compared with the unmodified and commercially available ion exchange resins.

The results given in Examples 2, 6, 7 and 8 clearly show that the amidoxime-based (LIX 84I) superhydrophilic polymers showed significantly better loading of copper and exceptional rejection of iron. The carboxylic acid resin initially loaded copper, but this was rapidly replaced by iron. The sulphonic acid loaded iron in preference to copper.

What is claimed is:

1. A process for the extraction of metal anions and cations from solutions and/or slurries including the steps of
   (a) contacting a metal ion-containing solution with an ion exchange material comprising a polyurethane foam having an ion exchange medium contained therein, wherein the foam includes a polyurethane that contains poly(oxyethylene) moieties having a molecular weight of 1,000–1,400;
   (b) separating the ion exchange material from the solution and/or slurry; and
   (C) recovering the sorbed metal ions from the ion exchange medium.

2. A process for the extraction of metal anions and cations from aqueous solutions and/or slurries including the steps of:
   (a) contacting a metal ion-containing aqueous solution with an ion exchange material comprising a silicone surfactant free polyurethane foam having an ion exchange medium contained therein, wherein the material has been formed by reacting an isocyanate terminated prepolymer, which is based on poly(oxyethylene) glycol and isocyanate selected from TDI, MDI, MDI-based isocyanates and mixtures, with an excess of water in the presence of an ion-exchange medium in the form of a solid ion exchange polymer, an organic ion exchange liquid absorbed into a solid sorbent or a porous granule, or a water-based ion exchange polymer emulsion, and in the absence of a silicone surfactant to form the foam;
   (b) separating the ion exchange material from the solution and/or slurry; and
   (c) recovering the sorbed metal ions from the ion exchange medium.

3. An ion exchange material comprising a polyurethane foam having an ion exchange medium contained therein wherein the foam includes a polyurethane that contains poly(oxyethylene) moieties having a molecular weight of 1,000–1,400.

4. An ion exchange material according to claim 3 wherein the ion exchange medium is selected for sorbing metal ions from a solution and/or slurry.

5. An ion exchange material according to claim 3 wherein the ion exchange medium is in the form of a bead, resin, fibre, foam, or liquid.

6. An ion exchange material according to claim 3 wherein the ion exchange medium is in liquid form and is imbibed into a solid sorbent for embedding into the polyurethane foam.

7. An ion exchange material according to claim 3 wherein the ion exchange medium is in the form of an emulsion or suspension for imbibing into the polyurethane.

8. An ion exchange material according to claim 4 wherein the ion exchange medium is in the form of a bead, resin, fibre, foam, or liquid.

9. An ion exchange material according to claim 4 wherein the ion exchange medium is in liquid from and is imbibed into a solid sorbent for embedding into the polyurethane foam.

10. An ion exchange material according to claim 5 wherein the ion exchange medium is in liquid from and is imbibed into a solid sorbent for embedding into the polyurethane foam.

11. An ion exchange material according to claim 4 wherein the ion exchange medium is in the form of an emulsion or suspension for imbibing into the polyurethane.

12. An ion exchange material according to claim 5 wherein the ion exchange medium is in the form of an emulsion or suspension for imbibing into the polyurethane.

13. An ion exchange material according to claim 6 wherein the ion exchange medium is in the form of an emulsion or suspension for imbibing into the polyurethane.

* * * * *